(12) United States Patent
Shono et al.

(10) Patent No.: US 6,318,912 B1
(45) Date of Patent: Nov. 20, 2001

(54) ADAPTER HAVING A TILT AND SHIFT MECHANISM

(75) Inventors: Tetsuji Shono, Saitama; Jun Hirakawa, Kanagawa, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/391,181

(22) Filed: Sep. 8, 1999

(30) Foreign Application Priority Data

Sep. 9, 1998 (JP) .................................................. 10-255528

(51) Int. Cl.$^7$ ................................. G03B 5/06; G02B 7/02
(52) U.S. Cl. ............................ 396/342; 396/530; 359/822
(58) Field of Search .............................. 396/71, 342, 530, 396/343; 359/433, 554, 557, 822

(56) References Cited

U.S. PATENT DOCUMENTS 4,229,094 * 10/1980 Baab et al. ............................ 396/342
5,592,331 * 1/1997 Eastcott .................................. 359/554

* cited by examiner

*Primary Examiner*—Christopher E. Mahoney
*Assistant Examiner*—Arthur A Smith
(74) *Attorney, Agent, or Firm*—Greenblum & Bernstein, P.L.C.

(57) ABSTRACT

An adapter having a tilt and shift mechanism which is mounted between a camera body and a photographic lens to relatively tilt or shift the camera body. The photographic lens includes a body mount frame which is provided with a mount to which the camera body can be detachably mounted, a tilt frame which is connected to the body mount frame, and a shift frame which is provided with a lens mounting mount to which the photographic lens can be detachably mounted and which is connected to the tilt frame to linearly move in a direction intersecting the optical axis of the photographic lens. The tilt frame is connected to the body mount frame to move along an arc having a predetermined radius, the center of the radius being located on a center of an image surface.

28 Claims, 8 Drawing Sheets

ADAPTER HAVING A TILT AND SHIFT MECHANISM

BACKGROUND OF THE INVENTION

1. Field of the Invention

The present invention relates to an adapter provided with a tilt and shift mechanism which is adapted to move (tilt and shift) an optical system, e.g., a photographic lens, relative to a camera body.

2. Description of the Related Art

Upon photographing a high-rise building or a tall tree viewing upwards, or photographing a deep object viewing downwards, the entirety of the object to be taken cannot always fit within a depth of field. In such a case, the close and/or distant portion(s) of the object become out of focus. Moreover, upon taking a picture of a high-rise building or a tall tree while looking up or down, an image of an upper or lower portion of the object located farther from the camera is made small since light which carries the object image is converged onto a distant point, and hence the image is unnatural. To prevent this, it is known to provide an adapter having a tilt and shift mechanism which tilts or shifts the photographic lens relative to the camera body, between the photographic lens and the camera body.

However, in a camera having an interchangeable lens, such as a single lens reflex camera, if the diameter of a body mount or a mirror box thereof is small relative to the outer diameter of the photographic lens, vignetting of the object light, in which the object light is eclipsed by the body mount or the inner surface of the mirror box, is caused even by a slight tilt or shift.

Furthermore, if a conventional adapter is mounted between the camera body and the photographic lens, the flange back is increased, so that the photographic lens cannot be focused upon a distant object.

SUMMARY OF THE INVENTION

It is an object of the present invention to provide an improved tilting-and-shifting device for an optical system, which is free from the above-mentioned drawbacks and which can be advantageously used for camera having an interchangeable lens, such as a single lens reflex camera.

To achieve the object mentioned above, according to the present invention, there is provided an adapter having a tilt and shift mechanism which is mounted between a camera body and a photographic lens to relatively tilt or shift the camera body. The photographic lens includes: a body mount frame which is provided with a mount to which the camera body is detachably mounted; a tilt frame which is connected to the body mount frame, and a shift frame which is provided with a lens mounting mount to which the photographic lens can be detachably mounted and which is connected to the tilt frame to linearly move in a direction intersecting the optical axis of the photographic lens; wherein the tilt frame is connected to the body mount frame to move along an arc having a predetermined radius, the center of the radius being located on a center of an image surface.

With this arrangement, upon tilting, it is possible to form an object image which is on an extension of the optical axis of the photographic lens at the center of the image surface, regardless of the kind of the mounted photographic lens. Moreover, if the tilting occurs after the shifting, the object image on an extension of the optical axis of the photographic lens can be held in the same position on the image surface, regardless of the tilt position.

The tilt frame is provided with an adapter optical system which is adapted to make the focal position of the photographic lens mounted to the adapter coincident with a film surface of the camera. Consequently, the object image on the center portion of the image surface is always in focus, regardless of the tilt position.

Preferably, the body mount frame includes a stationary mount frame which is provided with a mount to which the mount of the camera body is detachably mounted, and a rotatable mount frame connected to the stationary mount frame to rotate about an axis normal to the image surface at the center thereof, the tilt frame being connected to the rotatable mount frame.

Preferably, a click-stop mechanism is further provided between the rotatable mount frame and the stationary mount frame to click and stop the rotatable mount frame at a predetermined angular step.

Preferably, the shift frame is provided with a securing member which is adapted to secure the shift frame to another member. Accordingly, a desired shift effect or tilt effect can be obtained, based on the object caught by the photographic lens.

Preferably, the securing member is a threaded hole in which a screw of a tripod can be screwed.

Preferably, the threaded hole is provided on the side surface of the shift frame that lies in a plane parallel to the sliding direction of the shift frame relative to the tilt frame, and the threaded hole extends in a direction perpendicular to the sliding direction.

Preferably, when the screw of the tripod is secured in the threaded hole of the shift frame, the camera body, which is mounted to the mount provided with the body mount frame, can be tilted or shifted with respect to the mount.

The present disclosure relates to subject matter contained in Japanese Patent Application No.10-255528 (filed on Sep. 9, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
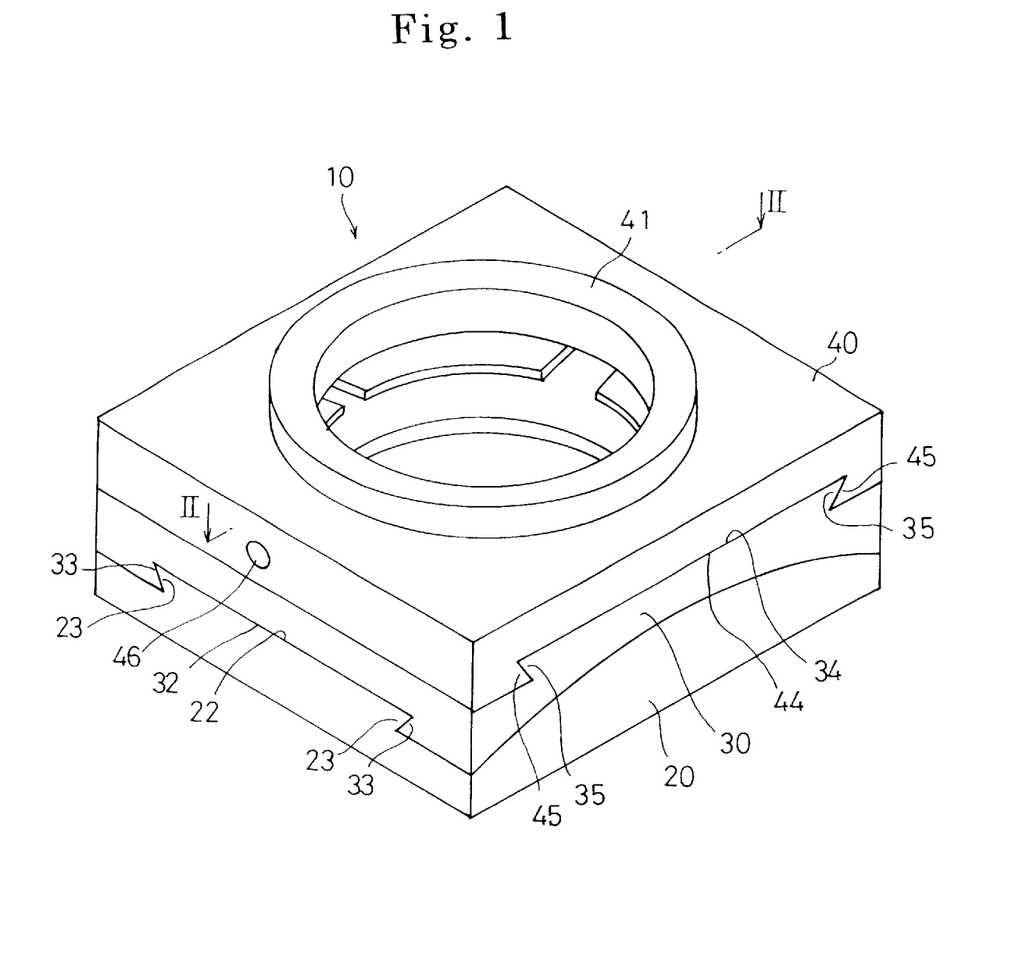
FIG. 1 is a perspective view of an adapter having a tilt and shift mechanism according to an embodiment of the present invention.
Figure 2:
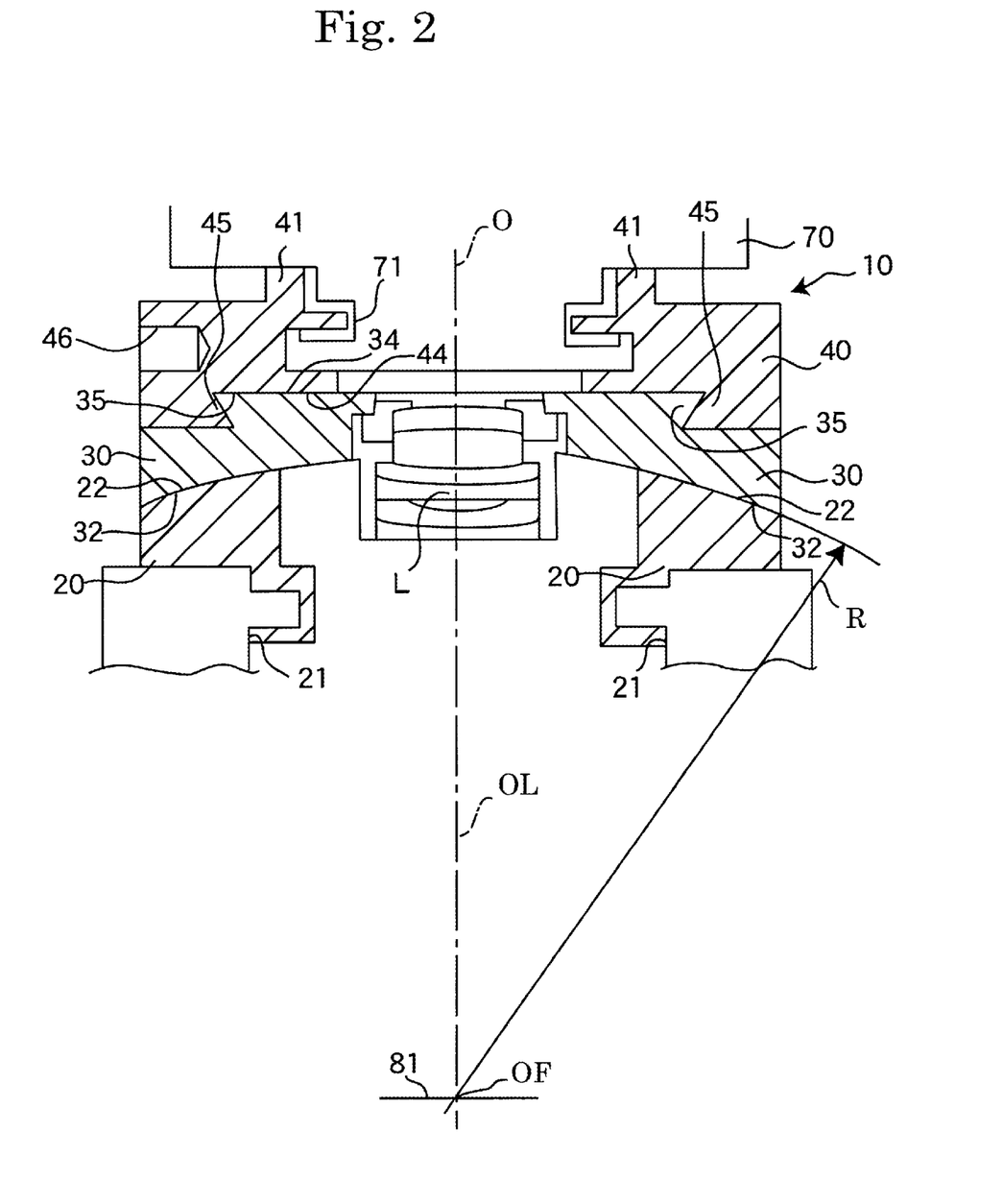
FIG. 2 is a sectional view taken along the line II—II in FIG. 1.

FIG. 1 shows a perspective view of an apparatus for tilting and shifting an optical system. FIG. 2 shows a sectional view taken along a plane including the optical axis of a single lens reflex camera body to which the tilt and shift device is mounted.

An adapter 10 having a tilt and shift device includes a body mount frame 20, a tilt frame 30 which is slidably connected to the body mount frame 20 to move along an arc having a predetermined radius, and a shift frame 40 which is slidably connected to the tilt frame 30. The body mount frame 20 is provided, on the end surface thereof opposed to the first tilt frame connecting surface 22, with a body frame mount 21 which can be detachably attached to a body mount 61 of a camera body 60. The shift frame 40 is provided, on the end surface thereof opposed to the second tilt frame connecting surface 44, with a shift frame mount 41 to which a lens mount 71 of a photographic lens 70 can be detachably attached. The tilt frame 30 is connected to the shift frame, 40 so as to slide in a direction intersecting the optical axis of the photographic lens 70 mounted thereto (a direction perpendicular to the optical axis and perpendicular to the tilt direction of the tilt frame 30 in the illustrated embodiment).

The adapter 10 which includes the body mount frame 20, the tilt frame 30 and the shift frame 40, is in the form of a generally rectangular parallelepiped and has a rectangular cross section viewed from the photographic lens 70 side. The body mount frame 20 and the shift frame 40 are provided with circular openings which define a light path and the tilt frame 30 is provided with an elongated opening which extends in the shift direction of the shift frame 40 and defines the light path.

The tilt frame 30 is provided with an adapter lens group L mounted thereto, which serves as an adapter optical system to make the focal position of the photographic lens 70, which is attached to the camera body 60 via the adapter 10, coincident with the focal position of the photographic lens 70 when directly attached to the camera body 60 without use of the adapter 10 (FIG. 2).

The optical axis OL of the adapter lens group L is, in the initial position, equivalent to the optical axis O (i.e., the optical axis of the photographic lens 70 mounted to the camera body 60) which is equivalent to a line normal to a film surface (image surface) 81 at the center thereof. Furthermore, the initial position is defined by the position wherein the tilt frame 30 and the shift frame 40 have not been tilted or shifted.

The tilt frame 30 is slidable relative to the body mount frame 20 along an arc having a predetermined radius, wherein the center of the radius is located at an intersection point OF between the optical axis O and the film surface 81. With this arrangement, when the tilt frame 30 is rotated to tilt the photographic lens 70, movement of the intersection point between the optical axis OL of the adapter lens group L and the film surface 81 does not occur. Namely, in a focused state, the focal point of the photographic lens 70 is constant regardless of any tilt applied. In the initial position of the adapter 10, the intersection point between the optical axis OL and the film surface 81 is coincident with the intersection point OF and the coincidence is maintained during a tilting operation.

The connecting surfaces of the body mount frame 20 and the tilt frame 30 are formed from convex and concave smooth surfaces (first tilt frame connecting surface) 22 and (body mount connecting surface) 32, respectively, which are in sliding contact with each other, and which are defined by a part of a cylindrical surface whose center of curvature is located on a line perpendicular to the optical axis O (i.e., a line perpendicular to the sheet of the drawing of FIG. 2) at the intersection point OF. The body mount frame 20, and the tilt frame 30 are fitted and interconnected so as to relatively slide through a pair of engageable sliding connectors 23 and 33 (dovetail joint) having a triangular cross sectional shape, which are provided at opposite edges of the body mount frame 20 and the tilt frame 30 on opposite sides of the center axis of the convex and concave smooth surfaces 22 and 32, respectively, and extend therealong. Consequently, the body mount frame 20 and the tilt frame 30 are connected to relatively rotate or tilt about the axis of rotation passing through the intersection point OF (i.e., the axis passing through the intersection point OF and perpendicular to the sheet of FIG. 2).

The connecting surfaces of the tilt frame 30 and the shift frame 40 are respectively defined by smooth flat surfaces (shift frame connecting surface) 34 and (second tilt frame connecting surface) 44, so that the tilt frame 30 and the shift frame 40 are relatively (linearly) slidable in the direction perpendicular to the optical axis O and perpendicular to the above-mentioned axis of rotation passing through the intersection point OF. The tilt frame 30 and the shift frame 40 are fitted and interconnected so as to relatively slide through a pair of engageable sliding connectors 35 and 45 (dovetail joint) having a triangular cross sectional shape, which are provided at opposite edges of the body mount frame 20 and the tilt frame 30 in a direction parallel with the rotation axis of the convex and concave smooth surfaces 22 and 32, respectively, and which extend in the direction parallel with the rotation axis thereof. Consequently, the tilt frame 30 and the shift frame 40 are connected to relatively move (shift) in a direction parallel with the rotation axis (i.e., a direction perpendicular to the sheet of FIG. 2).

Although the tilt direction of the tilt frame 30 relative to the body mount frame 20 is perpendicular to the shift direction of the shift frame 40 relative to the tilt frame 30 in the illustrated embodiment, it is possible to design the adapter so that the tilt direction is identical to the shift direction.

If the photographic lens 70 is tilted while the camera body 60 is secured, by a tripod for example, it is difficult to determine the composition after the tilting operation, due to a large movement of the object image relative to the image surface. In the illustrated embodiment, the adapter 10 is constructed so that the photographic lens 70 is secured by, for example, a tripod which allows the camera body 60 to be easily tilted.

To this end, the shift frame 40 is provided on at least one side surface thereof with a threaded hole 46 in which a screw attached, for example, to a tripod head is screwed to secure the shift frame 40 to the tripod. When the shift frame 40 is secured to the tripod, the photographic lens 70 is secured to the tripod head together with the shift frame 40, so that the tilt frame 30, the body mount frame 20 and the camera body 60 can be moved (shifted) relative to the photographic lens 70 and the shift frame 40 and can be tilted about the intersection point OF. Therefore, a photographer can obtain a desired composition by tilting or shifting the camera body 60 while an object image is caught by the photographic lens 70.

It is preferable that the side surface of the shift frame 40 on which the threaded hole 46 is formed be protruded from the side surfaces of the tilt frame 30 and the body mount frame 20 so as to prevent the tilt frame 30, the body mount frame 20, and the camera body 60, from interfering with an anti-skid rubber member or a handle of the tripod head when the adapter 10 is secured to the tripod head.

As can be understood from the foregoing, in the illustrated embodiment, the camera body 60 is tilted about the intersection point OF without tilting the photographic lens 70, and hence the movement of the object image on the film surface is restricted, thus resulting in no or little change of the determined composition. Consequently, it is possible to visually confirm the tilt effect while observing the object image. Moreover, a correction of the composition after the tilting operation can be easily carried out.

Figure 3:
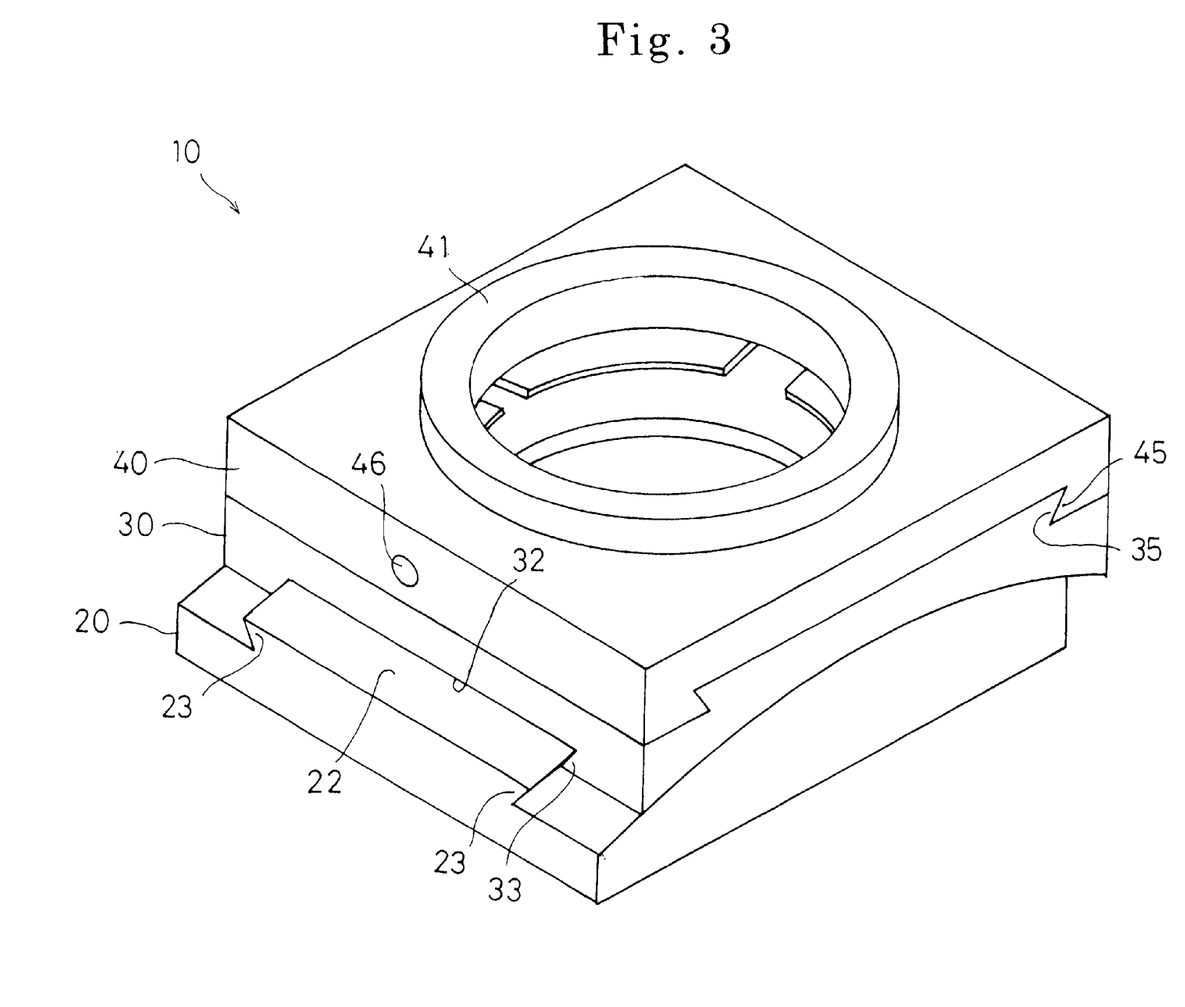
FIG. 3 is a perspective view of an adapter in, a tilted position, according to the present invention.
Figure 4:
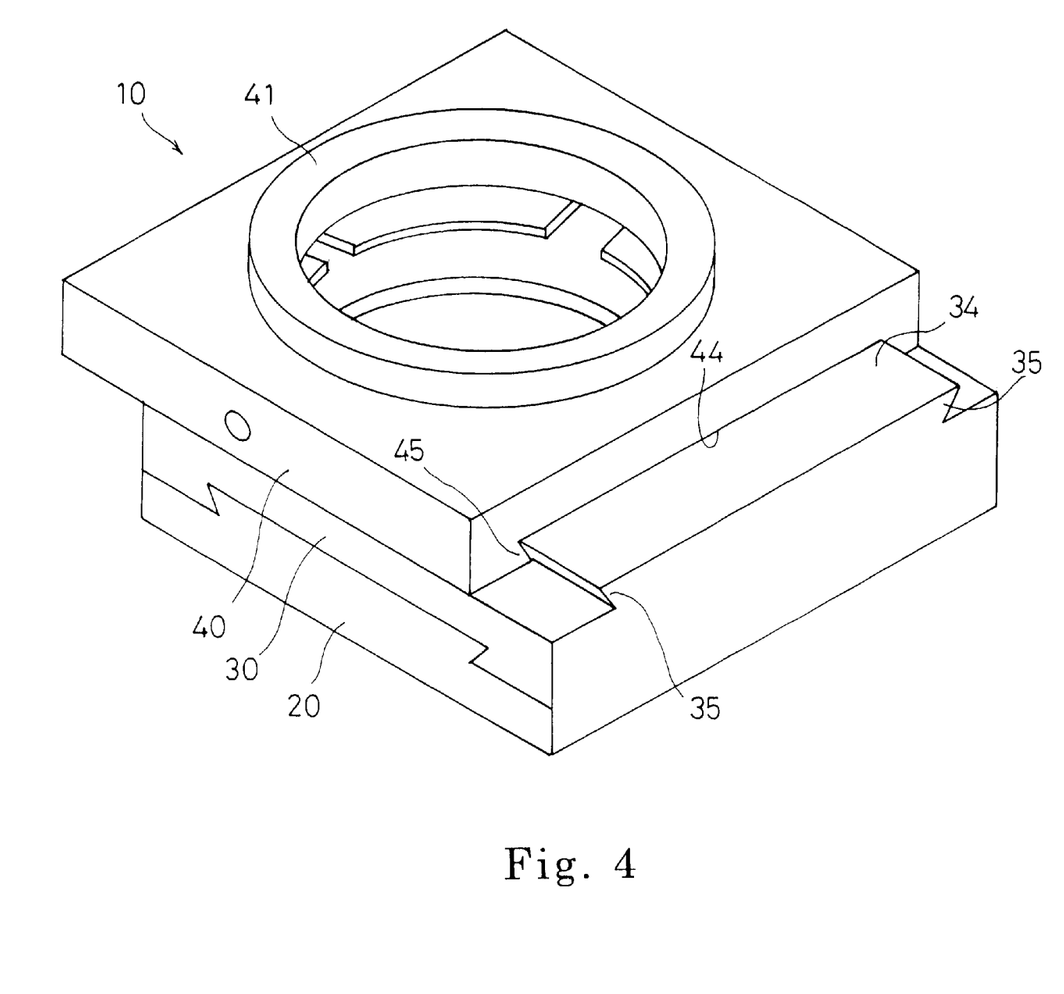
FIG. 4 is a perspective view of an adapter in a shifted position, according to the present invention.
Figure 5:
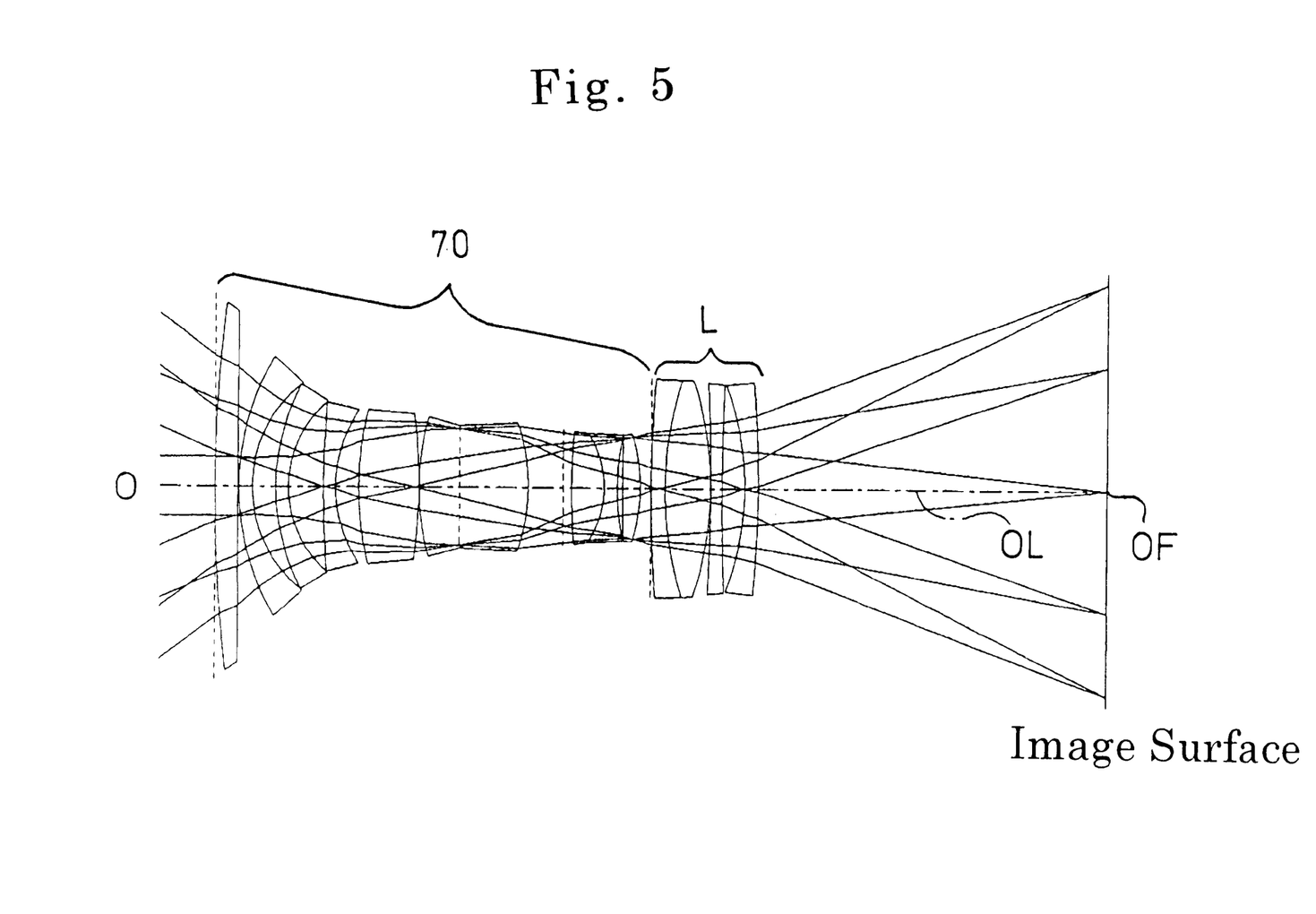
FIG. 5 is a diagram showing object carrying light in an initial position when a photographic lens is mounted to an adapter, according to the present invention.
Figure 6:
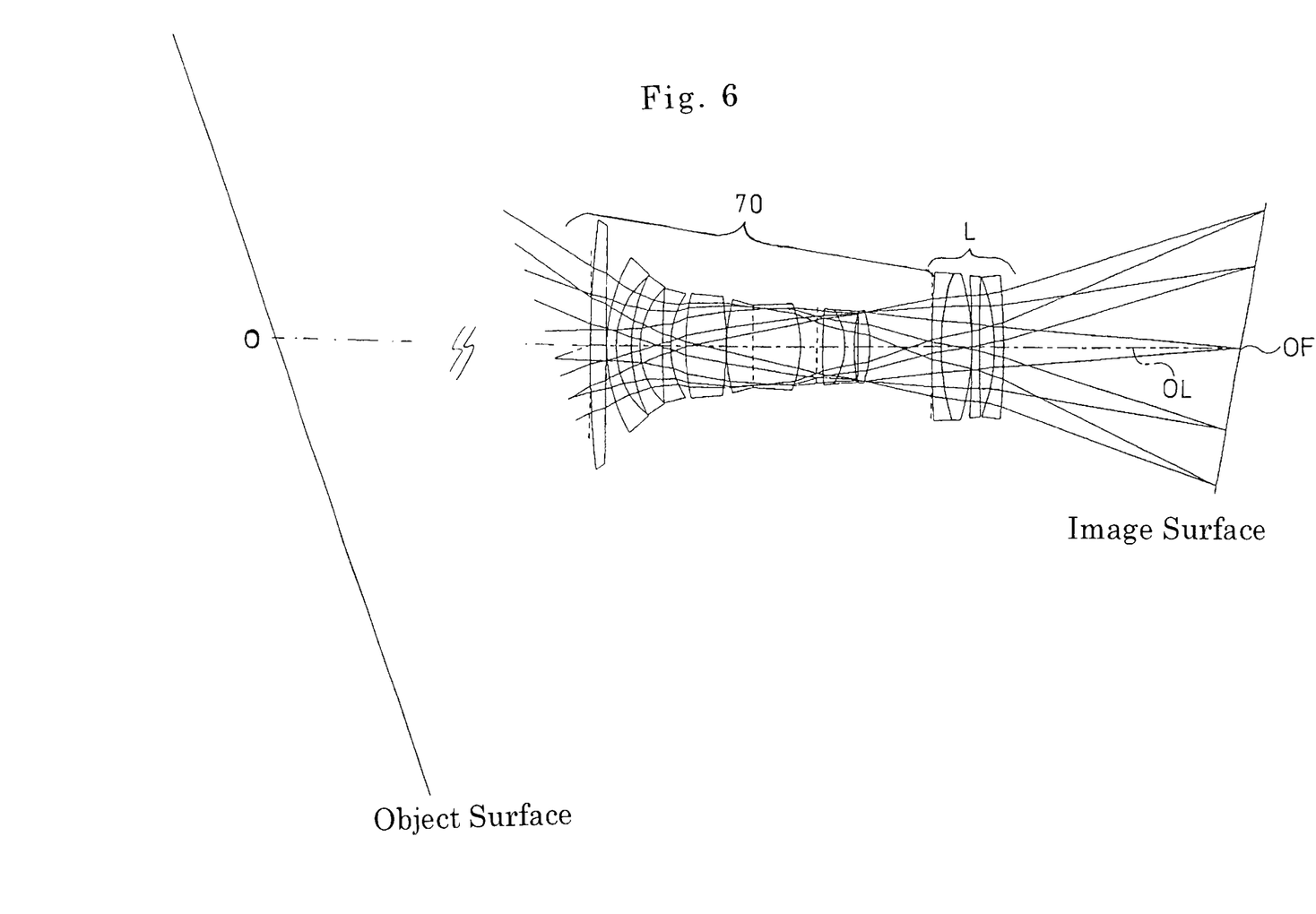
FIG. 6 is a diagram showing object carrying light in a tilted position when a photographic lens is mounted to an adapter, according to the present invention.
Figure 7:
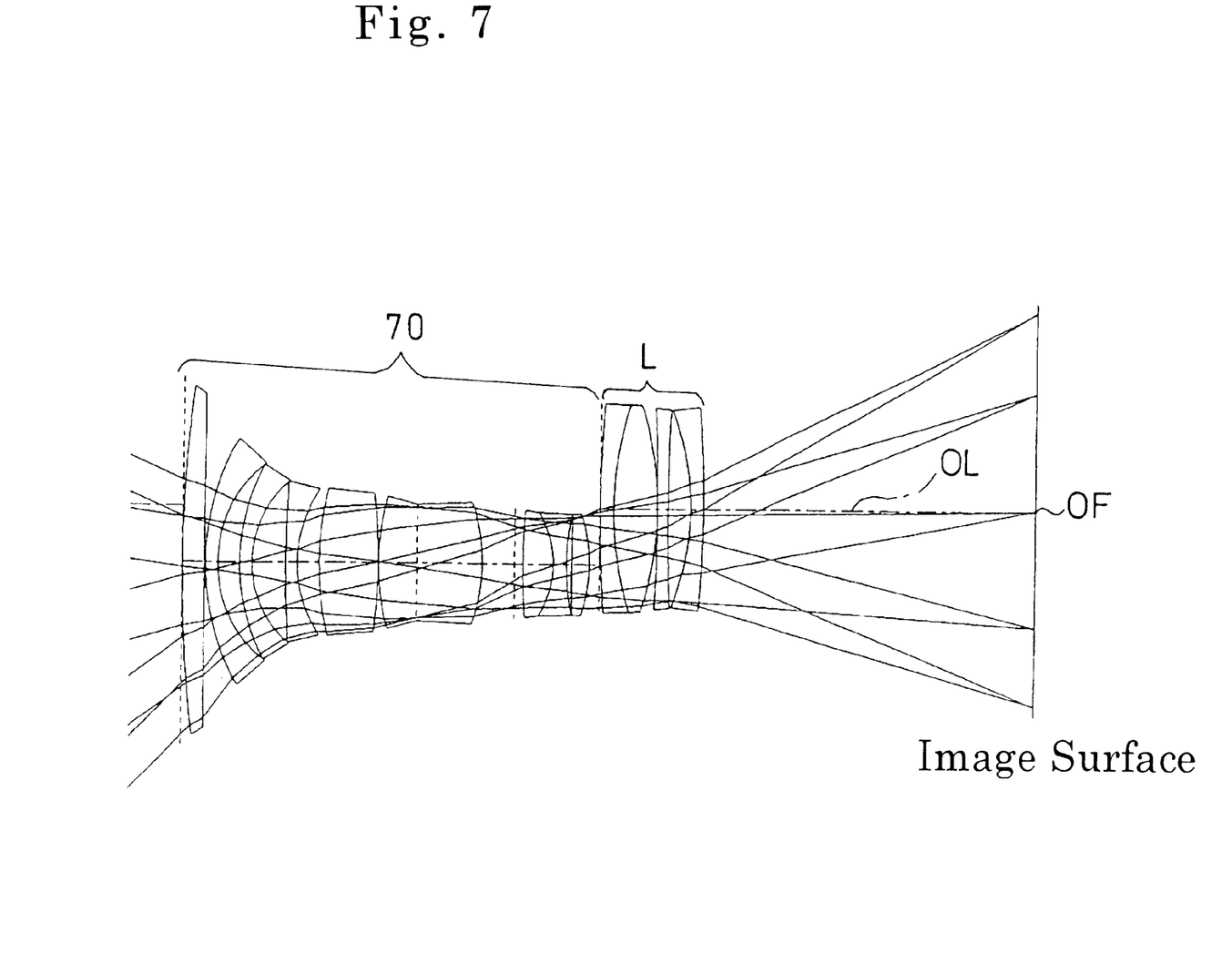
FIG. 7 is a diagram showing object carrying light in a shifted position when a photographic lens is mounted to an adapter, according to the present invention.

FIG. 3 shows the adapter 10 which has been tilted from the initial position, and FIG. 4 shows the adapter 10 which has been shifted from the initial position. FIGS. 5, 6 and 7 show bundles of light passing through the photographic lens 70 to which the adapter 10 is attached (the adapter 10 is not shown in FIGS. 5 through 7). When the tilt frame 30 and the shift frame 40 are in the initial position, the optical axis of the photographic lens 70 and the optical axis OL of the adapter lens group L are equivalent to the optical axis O of the camera body and intersect the film surface at the intersection point OF. The back focus of the photographic lens 70 is corrected by the adapter lens group L so that no focus error occurs.

If the photographic lens 70 (tilt frame 30) is tilted upward from the initial position as shown in FIG. 3, the object surface corresponding to the image surface formed on the film surface is tilted in the direction opposite to the inclination direction of the image surface with respect to the photographic lens 70, as can be seen in FIG. 6. However, the intersection point of the optical axis OL of the adapter lens L and the film surface does not move from the intersection point OF.

If the photographic lens 70 (shift frame 40) is shifted from the initial position (as shown in FIG. 4), the object surface corresponding to the image surface formed on the film surface is moved in the direction opposite to the shift direction of the photographic lens 70, as shown in FIG. 7; so that an object image is formed by the light passing through the center portion of the photographic lens 70 at a position deviated from the center of the film surface.

Figure 8:
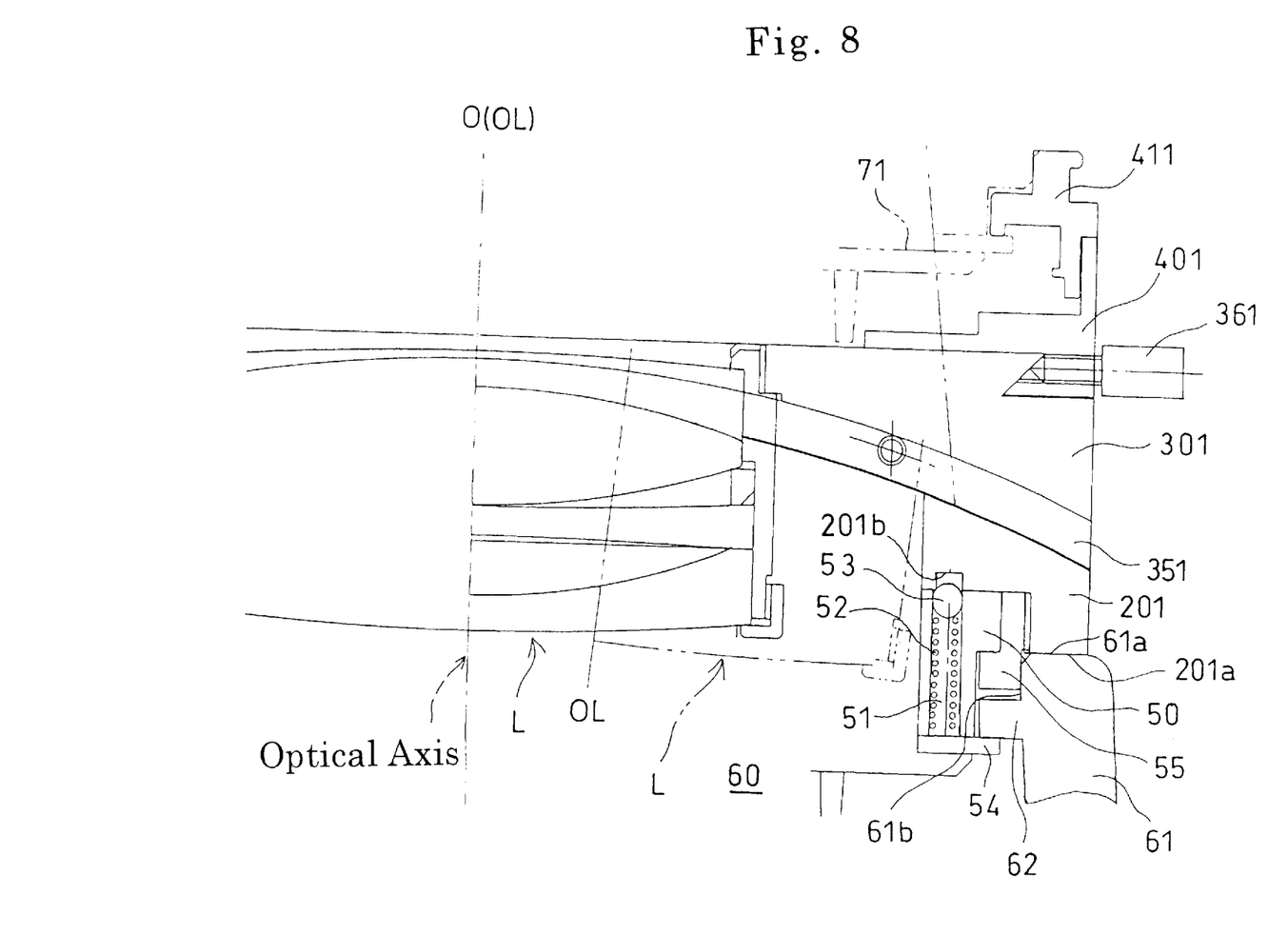
FIG. 8 is a longitudinal sectional view of another embodiment of the present invention.

FIG. 8 shows another embodiment of an adapter in which the tilt frame, the shift frame, and the photographic lens 70 are rotatable relative to the camera body 60.

The adapter includes a stationary mount frame 50, and a rotatable mount frame 201 which is connected to the stationary mount frame 50 through a nut 55 to rotate about a rotation axis equivalent to the optical axis O shown in FIG. 8. The mount 61 of the camera body 60 is provided with a lug 62 against wherein one end of a bayonet spring is secured to an axial end face of the stationary mount frame 50, and the other free end thereof being pressed against the stationary mount frame 50 against the mount 61. The rotatable mount frame 201 is in sliding contact at the end face 201a with the end face 61a of the mount 61, and the nut 55 is in sliding contact with the inner peripheral surface 61b of the mount 61, so that the nut 55 is rotatably held between the stationary mount frame 50 and the mount 61.

The tilt frame 301 and the shift frame 401 are rotatably connected to, and connected so as to be shift with respect to, the rotatable mount frame 201. The adapter lens group L is secured to the tilt frame 301 via a spacer 351. The spacer 351 serves not only as a lens holder which holds and secures the adapter lens group L to the tilt frame 301, but also serves as a tilting member which tilts the adapter lens group L along a smooth convex surface of the rotatable mount frame 201. Furthermore, though not shown, the rotatable mount frame 201 and the tilt frame 301, the tilt frame 301 and the shift frame 401, are interconnected by the same construction as the interconnection construction of the rotatable mount frame 20 and the tilt frame 30, and the tilt frame 30 and the shift frame 40, respectively. Note that 361 designates the shift set screw which is screwed in the shift frame 401 and which abuts at the front end thereof against the tilt frame 301 to set the shift position of the shift frame 401 relative to the tilt frame 301. In the illustrated embodiment, a similar tilt set screw (not shown) is also provided to secure or tilt the tilt frame 301 to or relative to the rotatable mount frame 201. Shift frame 401 is provided with a shift frame mount 411 to which a lens mount 71 of a photographic lens 70 can be detachably attached.

The rotatable mount frame 201 is rotatable about the axis identical to the optical axis O of the camera body 60 when mounted to the mount 61 of the camera body 60. The rotatable mount frame 201 can be clicked and stopped at a predetermined angular position via a click-stop mechanism. The click-stop mechanism can include, for example, a ball hole 51 which is formed in the stationary mount frame 50 and which extends in the direction parallel with the optical axis, a click ball 53 which is inserted in the ball hole 51 and which is biased by a spring 52 in the direction to project from the ball hole 51, and click holes 201b which are formed in the rotatable mount frame 201 and in which the click ball 53 is disengageably engaged. The click holes 201b are spaced at a predetermined angular distance on a circle wherein center thereof is located on the rotation axis of the rotatable mount frame 201. The surface portions of the rotatable mount frame 201 between the click holes 201b are formed so that the click ball 53 can smoothly roll thereon.

With the click-stop mechanism, it is possible to tilt or shift the photographic lens 70 by a predetermined angle from the initial position in which the photographic lens 70 can be tilted in the right and left directions and is shiftable in the upward and downward directions. The number of click balls 53 and the click holes 201b is optional and the number of click-stop steps is also optional. It is preferable that the photographic lens 70 be clicked and stopped at predetermined angular positions at least in the horizontal and vertical angular positions.

As can be understood from the above discussion, in a adapter having a tilt and shift mechanism according to the present invention, since the tilt frame is movable along a predetermined arc wherein the center of the arc is located on the center of the image surface, the object image which is on an extension of the optical axis of the photographic lens can be formed at the center of the image surface when the tilting is carried out, regardless of the kind of photographic lens attached to the camera body.

Moreover, since the tilt frame is provided with an adapter optical system secured thereto, which is adapted to make the focal position of the photographic lens mounted to the adapter coincident with the film surface of the camera, it is possible to use the camera to which the adapter is mounted at any object distances including an infinite object distance.

Furthermore, since the photographic lens and the camera body are relatively rotatable, tilting and shifting can be carried out in any directions. Since the shift frame to which the photographic lens is to be mounted is provided with a securing member, the photographic lens is secured by securing the shift frame, so that the camera body can be tilted or shifted.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An adapter having a tilt and shift mechanism which is mounted between a camera body and a photographic lens to relatively tilt or shift the camera body and the photographic lens, said adapter comprising:

a body mount frame which is provided with a mount to which the camera body is detachably mounted;

a tilt frame which is connected to the body mount frame; and, a shift frame which is provided with a lens mounting mount to which the photographic lens can be detachably mounted and which is connected to the tilt frame to linearly move in a direction intersecting the optical axis of the photographic lens;

wherein said tilt frame is connected to the body mount frame to move along an arc having a predetermined radius, the center of said radius being located on a center of an image surface.

2. An adapter having a tilt and shift mechanism according to claim 1, wherein said tilt frame is provided with an adapter optical system which is adapted to make the focal position of the photographic lens mounted to the adapter coincident with a film surface of the camera.

3. An adapter having a tilt and shift mechanism according to claim 1, wherein said shift frame is provided with a securing member which is adapted to secure the shift frame to another member.

4. An adapter having a tilt and shift mechanism according to claim 1, wherein said tilt frame and said body mount frame include curved surfaces which engage one another in sliding contact to enable movement of said tilt frame along the arc.

5. An adapter having a tilt and shift mechanism according to claim 4, wherein the curved surface of said tilt frame is concave and the curved surface of said body mount frame is convex.

6. An adapter having a tilt and shift mechanism according to claim 4, wherein the curved surfaces of said tilt frame and said body mount frame include engageable sliding connectors extending in the direction of movement of said tilt frame along the arc.

7. An adapter having a tilt and shift mechanism according to claim 6, wherein the sliding connectors of said tilt frame and said body mount frame have complementary cross sectional shapes.

8. An adapter having a tilt and shift mechanism according to claim 7, wherein the sliding connector of said body mount frame is slidingly engaged within the sliding connector of said tilt frame.

9. An adapter having a tilt and shift mechanism according to claim 6, wherein the sliding connector of said body mount frame is slidingly engaged within the sliding connector of said tilt frame.

10. An adapter having a tilt and shift mechanism which is mounted between a camera body and a photographic lens to relatively tilt or shift the camera body and the photographic lens, said adapter comprising:

a body mount frame which is provided with a mount to which the camera body is detachably mounted;

a tilt frame which is connected to the body mount frame; and, a shift frame which is provided with a lens mounting mount to which the photographic lens can be detachably mounted and which is connected to the tilt frame to linearly move in a direction intersecting the optical axis of the photographic lens;

wherein said tilt frame is connected to the body mount frame to move along an arc having a predetermined radius, the center of said radius being located on a center of an image surface; and wherein said body mount frame comprises a stationary mount frame which is provided with a mount to which the mount of the camera body is detachably mounted, and a rotatable mount frame connected to the stationary mount frame to rotate about an axis normal to the image surface at the center thereof, said tilt frame being connected to the rotatable mount frame.

11. An adapter having a tilt and shift mechanism according to claim 10, further comprising a click-stop mechanism provided between the rotatable mount frame and the stationary mount frame to click and stop the rotatable mount frame at a predetermined angular step.

12. An adapter having a tilt and shift mechanism according to claim 10, wherein said tilt frame is provided with an adapter optical system which is configured to make the focal position of the photographic lens mounted to the adapter coincident with a film surface of the camera.

13. An adapter having a tilt and shift mechanism according to claim 10, wherein said tilt frame and said body mount frame include curved surfaces which engage one another in sliding contact to enable movement of said tilt frame along the arc.

14. An adapter having a tilt and shift mechanism according to claim 13, wherein the curved surface of said tilt frame is concave and the curved surface of said body mount frame is convex.

15. An adapter having a tilt and shift mechanism according to claim 13, wherein the curved surfaces of said tilt frame and said body mount frame include engageable sliding connectors extending in the direction of movement of said tilt frame along the arc.

16. An adapter having a tilt and shift mechanism according to claim 15, wherein the sliding connectors of said tilt frame and said body mount frame have complementary cross sectional shapes.

17. An adapter having a tilt and shift mechanism according to claim 16, wherein the sliding connector of said body mount frame is slidingly engaged within the sliding connector of said tilt frame.

18. An adapter having a tilt and shift mechanism according to claim 15, wherein the sliding connector of said body mount frame is slidingly engaged within the sliding connector of said tilt frame.

19. An adapter having a tilt and shift mechanism which is mounted between a camera body and a photographic lens to relatively tilt or shift the camera body and the photographic lens, said adapter comprising:

a body mount frame which is provided with a mount to which the camera body is detachably mounted;

a tilt frame which is connected to the body mount frame; and, a shift frame which is provided with a lens mounting mount to which the photographic lens can be detachably mounted and which is connected to the tilt frame to linearly move in a direction intersecting the optical axis of the photographic lens;

wherein said tilt frame is connected to the body mount frame to move along an arc having a predetermined radius, the center of said radius being located on a center of an image surface; and wherein said shift frame is provided with a securing member which is adapted to secure the shift frame to another member, said securing member being a threaded hole in which a screw of a tripod can be screwed.

20. An adapter having a tilt and shift mechanism according to claim 19, wherein said threaded hole is provided on the side surface of the shift frame that lies in a plane parallel to the sliding direction of the shift frame relative to the tilt frame, and the threaded hole extends in a direction perpendicular to the sliding direction.

21. An adapter having a tilt and shift mechanism according to claim 19, wherein when said screw of the tripod is secured in said threaded hole of said shift frame, said camera body, which is mounted to said mount provided with said body mount frame, can be tilted or shifted with respect to said mount.

22. An adapter having a tilt and shift mechanism according to claim 19, wherein said tilt frame is provided with an adapter optical system which is configured to make the focal position of the photographic lens mounted to the adapter coincident with a film surface of the camera.

23. An adapter having a tilt and shift mechanism according to claim 19, wherein said tilt frame and said body mount frame include curved surfaces which engage one another in sliding contact to enable movement of said tilt frame along the arc.

24. An adapter having a tilt and shift mechanism according to claim 23, wherein the curved surface of said tilt frame is concave and the curved surface of said body mount frame is convex.

25. An adapter having a tilt and shift mechanism according to claim 23, wherein the curved surfaces of said tilt frame and said body mount frame include engageable sliding connectors extending in the direction of movement of said tilt frame along the arc.

26. An adapter having a tilt and shift mechanism according to claim 25, wherein the sliding connectors of said tilt frame and said body mount frame have complementary cross sectional shapes.

27. An adapter having a tilt and shift mechanism according to claim 26, wherein the sliding connector of said body mount frame is slidingly engaged within the sliding connector of said tilt frame.

28. An adapter having a tilt and shift mechanism according to claim 25, wherein the sliding connector of said body mount frame is slidingly engaged within the sliding connector of said tilt frame.

* * * * *